United States Patent
Adam et al.

(10) Patent No.: US 12,358,321 B2
(45) Date of Patent: Jul. 15, 2025

(54) DISK WHEEL FOR A MOTOR VEHICLE AND METHOD FOR PRODUCING A DISK WHEEL OF THIS TYPE

(71) Applicant: Bayerische Motoren Werke Aktiengesellschaft, Munich (DE)

(72) Inventors: Andreas Adam, Munich (DE); Florian Faschinger, Garching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 578 days.

(21) Appl. No.: 17/639,687

(22) PCT Filed: Sep. 28, 2020

(86) PCT No.: PCT/EP2020/077043
§ 371 (c)(1),
(2) Date: Mar. 2, 2022

(87) PCT Pub. No.: WO2021/094028
PCT Pub. Date: May 20, 2021

(65) Prior Publication Data
US 2022/0288969 A1   Sep. 15, 2022

(30) Foreign Application Priority Data
Nov. 13, 2019   (DE) ............... 10 2019 130 608.6

(51) Int. Cl.
*B60B 3/08*   (2006.01)
*B60B 3/12*   (2006.01)

(52) U.S. Cl.
CPC ............... *B60B 3/087* (2013.01); *B60B 3/12* (2013.01); *B60B 2900/111* (2013.01); *B60B 2900/311* (2013.01)

(58) Field of Classification Search
CPC ......... B60B 3/087; B60B 3/085; B60B 3/082; B60B 3/08; B60B 3/12; B60B 2900/111;
(Continued)

(56) References Cited

U.S. PATENT DOCUMENTS 2,048,442 A * 7/1936 Frank ................... B60B 3/08
                                                  301/37.104
3,533,662 A * 10/1970 Johnson ............... B62D 55/14
                                                  219/92

(Continued)

FOREIGN PATENT DOCUMENTS

CN   101017997 B * 10/2010 ............. H02K 15/12
CN   103009908 A    4/2013
(Continued)

OTHER PUBLICATIONS

FR2291873A1 Bartaire A Espace.net English Translation of Description (specification) (Year: 1976).*
(Continued)

*Primary Examiner* — S. Joseph Morano
*Assistant Examiner* — Eva L Comino
(74) *Attorney, Agent, or Firm* — Crowell & Moring LLP

(57) ABSTRACT

A disk wheel for a motor vehicle, in particular a single-track motor vehicle, includes: a wheel hub for mounting the disk wheel on the motor vehicle, which wheel hub is concentric to an axis of rotation of the disk wheel; a wheel rim, which is likewise concentric thereto; and a first and a second wheel disk. The first wheel disk and the second wheel disk each extend from the wheel rim toward the wheel hub, are mutually spaced on the wheel hub in a transverse direction which is parallel to the axis of rotation of the disk wheel, and run toward each other as they approach the wheel hub. The disk wheel also has at least two reinforcement ribs, which extend from the first wheel disk to the second wheel disk and
(Continued)

interconnect the first wheel disk and the second wheel disk. The reinforcement ribs are distributed evenly around the axis of rotation of the disk wheel.

17 Claims, 3 Drawing Sheets

(58) Field of Classification Search
CPC ......... B60B 2900/112; B60B 2900/311; B60B 21/02; B60B 25/006; B60Y 2200/12
USPC .................................................. 301/64.301
See application file for complete search history.

(56) References Cited

U.S. PATENT DOCUMENTS

| | | | | |
|---|---|---|---|---|
| 4,376,554 | A * | 3/1983 | Schumacher | B60B 7/0013 301/64.301 |
| 2005/0022384 | A1* | 2/2005 | Niedermann | B22D 17/007 29/894.35 |
| 2013/0076109 | A1* | 3/2013 | Ichikawa | B60B 1/08 301/66 |
| 2013/0209260 | A1* | 8/2013 | Stone | F01D 5/027 29/889.7 |
| 2017/0361646 | A1* | 12/2017 | Davis | B29C 45/14336 |

FOREIGN PATENT DOCUMENTS

| | | | | |
|---|---|---|---|---|
| CN | 103963564 | A | | 8/2014 |
| CN | 206049219 | U | | 3/2017 |
| CN | 208247958 | U | | 12/2018 |
| CN | 105829123 | B * | 3/2019 | ............... B60B 3/14 |
| DE | 433395 | A | | 8/1926 |
| DE | 433395 | C * | 8/1926 | ............... B60B 3/08 |
| DE | 74 18 979 | U | | 11/1974 |
| DE | 3035446 | A1 * | 5/1982 | ............... B60B 3/00 |
| DE | 10 2015 200 624 | A1 | | 7/2016 |
| EP | 0065086 | A1 * | 11/1982 | ............... B60B 5/02 |
| EP | 1 780 048 | A1 | | 5/2007 |
| FR | 2291873 | A * | 7/1976 | ............... B60B 1/08 |
| JP | 41-16961 | Y | | 8/1966 |
| JP | 53-122802 | U | | 9/1978 |
| JP | 54-170569 | U | | 12/1979 |
| JP | 2005199785 | A * | 7/2005 | ............. B60C 29/02 |
| JP | 2013-67268 | A | | 4/2013 |
| WO | WO-2019201510 | A1 * | 10/2019 | ............. B60B 21/02 |

OTHER PUBLICATIONS

DE433395C Espace.net translation of description Aug. 26, 1926 (Year: 1926).*

International Search Report (PCT/ISA/210) issued in PCT Application No. PCT/EP2020/077043 dated Dec. 15, 2020 with English translation (five (5) pages).

German-language Written Opinion (PCT/ISA/237) issued in PCT Application No. PCT/EP2020/077043 dated Dec. 15, 2020 (six (6) pages).

German-language Search Report issued in German Application No. 10 2019 130 608.6 dated Jul. 29, 2020 with partial English translation (12 pages).

English translation of Chinese-language Office Action issued in Chinese Application No. 202080060205.2 dated May 23, 2023 (6 pages).

Japanese-language Office Action issued in Japanese Application No. 2022-515878 dated Mar. 21, 2024 with English translation (5 pages).

* cited by examiner

DISK WHEEL FOR A MOTOR VEHICLE AND METHOD FOR PRODUCING A DISK WHEEL OF THIS TYPE

BACKGROUND AND SUMMARY OF THE INVENTION

The invention relates to a disk wheel for a motor vehicle, in particular a single-track motor vehicle such as, for example, a motorcycle, and to a method for producing a disk wheel of this type.

A multiplicity of wheels and also disk wheels for motor vehicles and for single-track motor vehicles are already known in the prior art.

Disk wheels basically have a surface which is substantially closed between the wheel hub and the wheel rim and no spokes or struts with openings located inbetween. The closed surfaces in the case of disk wheels reduce air turbulence, and therefore they have a positive effect on the aerodynamics of the vehicle.

In addition to this, in the case of single-track motor vehicles, the disk wheels are intended to be formed substantially symmetrically with respect to a plane of symmetry lying orthogonally to the axis of rotation of the disk wheels, in order to provide a substantially identical and thus attractive appearance to an observer from both possible observation sides and at the same time to provide substantially identical aerodynamic properties on both sides of the disk wheel.

For this purpose, it is already known in the prior art to provide metal sheets or other materials which in each case provide a closed surface to one of the sides of the disk wheel and extend from the wheel rim to the wheel hub. In order to ensure that the disk wheel is sufficiently stable, comparatively thick metal sheets or materials are selected, thus resulting in a high and therefore disadvantageous weight of the disk wheels known in the prior art.

The invention is therefore based on the object of overcoming the abovementioned disadvantages and of providing a stable and light disk wheel and an associated production method.

This object is achieved by the combination of features according to the independent claim.

According to the invention, a disk wheel for a motor vehicle is proposed, the motor vehicle preferably being a single-track motor vehicle, such as a motorcycle or a scooter, and the disk wheel furthermore preferably being the front wheel of the single-track motor vehicle. The disk wheel comprises a wheel hub, which is arranged concentrically with respect to an axis of rotation of the disk wheel, for mounting the disk wheel on the motor vehicle, a wheel rim which is likewise concentric with respect to said wheel hub and which serves in particular for receiving the tire and runs annularly about the hub, and a first wheel disk and a second wheel disk. The first wheel disk and the second wheel disk each extend from the wheel rim in the direction of the wheel hub, wherein the wheel disks are spaced apart from each other on the wheel hub in a transverse direction parallel to the axis of rotation of the disk wheel and converge with each other toward the wheel hub, thus preferably forming a cross-sectionally V-shaped cavity between the wheel disks. In order, with the smallest possible thickness of the wheel disks and an associated saving on material, to ensure the stability of the disk wheel, it is provided that the disk wheel according to the invention furthermore comprises at least two reinforcing ribs which extend from the first wheel disk to the second wheel disk and connect them to each other. The reinforcing ribs are distributed uniformly about the axis of rotation of the disk wheel.

By means of the reinforcing ribs and by means of the uniform distribution of the reinforcing ribs about the axis of rotation, the disk wheel or the first and the second wheel disk is/are subdivided into substantially uniformly sized sectors of a circle. The reinforcing ribs preferably extend continuously from the wheel rim along the sections of the disk wheels, in which the disk wheels are spaced apart from each other, as far as a section of the disk wheels, in which the latter lie directly on each other or are connected to each other.

The basic principle of the invention is that the wheel is closed toward its sides in the visual region by the wheel disks and is correspondingly designed as a disk wheel, wherein the wheel disks together with the rim, which is preferably formed from two sections, are stiffened by the reinforcing ribs. The visual region corresponds to a section adjacent radially inward to the wheel rim, since, when a wheel is mounted on the motor vehicle, a region directly adjacent to the wheel hub radially outward is concealed by further components of the motor vehicle. The reinforcing ribs can serve here at the same time for the integration of further functional elements or functions. In addition, the reinforcing ribs because of their uniform distribution about the axis of rotation are usable integrally as aligning weights, the weight of which can be reduced to a predetermined extent during a balancing operation and the disk wheel can thereby be balanced, and therefore at least smaller additional weights, if any at all, have to be arranged on the wheel in order to balance the latter.

Compared to disk wheels that are known in the prior art and have wheel disks, the thickness of the wheel disks and thereby the weight of the disk wheel can be significantly reduced. For example, it is possible by the provision of reinforcing ribs to form wheel disks that are otherwise at least 2.5 mm thick with a reduced thickness of 2 mm.

During the formation of the disk wheel by low-pressure gravity diecasting, the wheel disks prior to finishing explained further on or the wheel disks of a blank likewise explained further on have a wall thickness of between 4 and 6 mm and preferably a wall thickness of 5 mm.

If, during the production of the disk wheel, use is made of a sand core or of a plurality of sand cores which may also be necessary for producing the spoke basket or spoke cage and can be arranged on the outer sides of the wheel disks, wall thicknesses of the wheel disks of between 3 and 4 mm and preferably 3.5 mm can be realized during the casting process.

This wall thickness of the wheel disks can be further reduced by finish-machining.

On their side facing the wheel rim, the reinforcing ribs can have a rectilinear, or else alternatively also concave or convex shape. In particular a concave shape is advantageous here since each reinforcing rib forms sections which extend as a frame along the two wheel disks such that the region lying between the frames of a reinforcing rib remains free and material is saved.

In order to provide a closed surface in the visual region or adjacent to the wheel rim and thereby to form a disk wheel, it is provided, in an advantageous development of the invention, that the first and the second wheel disk each form a surface which is completely closed in the circumferential direction about the axis of rotation.

Furthermore, it is advantageous here, in a development, that the first and the second wheel disk extend from the wheel rim to the wheel hub at least over a quarter of the distance in the radial direction between wheel rim and wheel hub and furthermore preferably over half of the distance, and each form the closed surface.

In a region which is adjacent to the wheel hub and lies in the radial direction between the wheel disks and the wheel hub, free regions can be provided for saving weight.

If a brake disk is provided on the disk wheel, it is particularly advantageous if the first and the second wheel disk extend from the wheel rim to the wheel hub at least up to a height of an outer circumference of the brake disk, and a region which remains free from the wheel disks and is adjacent to the wheel hub is concealed by the brake disks. In this case, the annular surface on in each case one side of the wheel, said surface extending from the outer circumference of the brake disks to the wheel rim, corresponds to the visual region since the region located behind the brake disk is covered by the latter and is therefore substantially not visible.

One embodiment of the disk wheel preferably makes provision for the wheel rim to have two sections which are separated from each other. The two sections which are separated from each other and preferably each serve for receiving a closing bead of the tire lie in mirror-inverted form opposite each other with respect to a plane of symmetry, which is orthogonal to the axis of rotation, of the disk wheel. The two separated sections are connected to each other by the wheel disks.

A variant of the invention is particularly advantageous in which at least one reinforcing rib forms a cavity which is open to the wheel rim. The cavity, by being opened toward the wheel rim, is at the same time also connected in terms of flow to a tire pulled onto the wheel rim or to the interior of the tire, and therefore the internal pressure of the tire prevails in the cavity.

In a development, it is therefore provided that a sensor, such as, for example, a tire pressure sensor, can be arranged or is arranged in the cavity. Additionally or alternatively thereto, in one of the two wheel disks an opening is provided which leads to the cavity of the reinforcing rib and is therefore connected in terms of flow to the cavity and in which a sensor, such as, for example, a tire pressure sensor and/or a valve can be accommodated or is accommodated. By means of the cavity or by means of the opening, which leads to the cavity, in one of the wheel disks, a sensor and/or a valve as a functional element can therefore be integrated in the disk wheel.

Such a cavity can be provided in a reinforcing rib or in a plurality of reinforcing ribs, wherein a reinforcing rib having a cavity is preferably thicker in the circumferential direction of the disk wheel than surrounding reinforcing ribs, as a result of which measures for compensating for an imbalance may necessarily be provided. The imbalance which can arise both due to the reinforcing rib itself which has the cavity, but also to an associated sensor or an associated valve can be compensated for, for example, by one or more reinforcing ribs opposite one another with respect to the axis of rotation, or by the quantity of material used for the reinforcing ribs lying opposite one another. If an even number of reinforcing ribs is provided, more material can therefore be provided for the reinforcing rib which is opposite the reinforcing rib having the cavity. If an uneven number of reinforcing ribs is provided, the imbalance can be compensated for by the material which is used for the two adjacent reinforcing ribs that are closest to a position directly opposite the reinforcing rib with the cavity.

Since, during the production of the disk wheel, it may happen that a nonuniform distribution of material or else also additional weights, such as, for example, due to sensors or valves, leads to an imbalance at the disk wheel that would otherwise have to be compensated for by additional weights, it is provided, in an advantageous variant of the disk wheel, that excess material for balancing the disk wheel is provided on a side, facing the wheel rim, of at least a portion of the reinforcing ribs and/or in the circumferential direction of the disk wheel at least of the portion of the reinforcing ribs. The excess material can then be completely or at least partially removed during machining within the scope of the production of the disk wheel, and the disk wheel with or without sensors and/or valves provided thereon can be balanced. Furthermore, the excess material is preferably distinguished in that it can be completely removed without influencing a predetermined load-bearing capacity or stability of the reinforcing rib and thus of the entire disk wheel.

The disk wheel is preferably formed integrally. In particular, the essential components of the disk wheel, i.e. the wheel rim, the wheel disks, the reinforcing rib and the wheel hub and spokes which are possibly provided are formed integrally with one another and connected in an integrally bonded manner. Sensors and/or valves which are provided in variants of the disk wheel can be screwed into the reinforcing ribs, for example by means of a thread.

Suitable materials for the disk wheel or for the components formed integrally with one another include in particular cast aluminum alloys, steel, but also fiber-reinforced materials with a thermosetting or thermoplastic matrix. Accordingly, the disk wheel can be produced by a casting process, by a steel welding process or by processes for producing fiber composite components. In particular, rotational gravity diecasting can be used as the casting process.

In a first variant, the wheel disks extend from the wheel rim as far as the wheel hub, wherein the wheel disks here can have, adjacent to the wheel hub, a common section in which the first and second wheel disk are connected directly to each other and run in the same section as a common disk to the wheel hub.

In an alternative variant thereto, in which weight can additionally be saved, it is provided that the disk wheel furthermore comprises at least two spokes which each extend from the first wheel disk and the second wheel disk or from an edge section, facing the wheel hub, of the first and second wheel disk to the wheel hub and connect them to one another. In this case, a clearance which is free from any material can be formed between the spokes, by means of which the weight of the disk wheel is reduced further.

In addition, a section of the first and of the second wheel disk or a common extension of the first and of the second wheel disk can also extend along the spokes further in the direction of the wheel hub.

If spokes are provided on the disk wheel, an embodiment is advantageous in which the spokes are likewise distributed uniformly about the axis of rotation of the disk wheel.

It is also of advantage if the number of spokes corresponds to the number of reinforcing ribs, and the reinforcing ribs arranged between the wheel disks merge into the spokes. The reinforcing ribs can thereby also be referred to as inner spokes and the spokes as outer spokes, wherein the outer spokes of a disk wheel provided with a tire are concealed preferably by further components of the motor vehicle, such as brake disks or the entire brake system.

In order, in the region about the wheel hub, to permit at the same time as lightweight a construction of the disk wheel as possible and also the attaching of further functional elements to the disk wheel, in a likewise advantageous refinement of the invention, the spokes each run in a first section in a plane of symmetry, orthogonal to the axis of rotation, of the disk wheel and run offset with respect to the plane of symmetry or alternatively obliquely with respect thereto in a second section. The functional elements can be fixed to the spoke section running offset with respect to the plane of symmetry, wherein the second sections are preferably adjacent to a plane which determines the width of the disk wheel in the transverse direction.

In addition, it is provided, in a development of the invention, that the disk wheel furthermore has at least one group of fastening elements, arranged annularly about the wheel hub, for fixing a functional element to the disk wheel. A functional element which is fixed by a group of fastening elements may be, for example, a brake disk or a sensor disk. Preferably, two groups of fastening elements lying opposite each other with respect to the plane of symmetry of the disk wheel are provided on the disk wheel and a respective brake disk can be fastened to said groups. Furthermore preferably, a third group is provided which is formed in particular directly adjacent to the wheel hub and to which a sensor disk can be fixed. The fastening elements are furthermore preferably designed as openings which have a thread and which are provided in the spokes and in particular at a transition between the first and second section of the spokes.

Furthermore, spokes which are directly adjacent to one another can be connected by transverse struts, wherein the transverse struts are preferably provided at a transition of the first section to the second section of a spoke, said transverse struts furthermore preferably lying offset with respect to the plane of symmetry in the plane of the second sections. By means of the second sections of the spokes and the transverse struts running therebetween, a spoke basket or cage is formed about the wheel hub, at the junction points of which fastening elements for fixing the functional elements to the disk wheel can preferably be provided.

If spokes are intended to be provided with sections spaced apart from one another in the transverse direction and/or with transverse struts connecting the spokes, during the production use is preferably additionally made of a sand core which determines the shape of the spokes and transverse struts and is arranged between them and the hub. The sand core can be washed out later.

A further aspect of the invention relates to a method for producing a disk wheel according to the invention. In the proposed method, the disk wheel is formed integrally from a casting material and in particular from an aluminum alloy. During the production of the disk wheel, first of all a blank of the disk wheel that substantially corresponds to the disk wheel is cast in a casting die comprising at least two slides. The blank preferably differs from the finished disk wheel only in that excess material or an oversize is provided at least in sections on the peripheral regions of the disk wheel and which can be removed in order to improve the surface quality and in order to reduce the manufacturing tolerance. In the casting die, the slides are distributed uniformly about the axis of rotation of the disk wheel to be produced, wherein an intermediate space between in each case two directly adjacent slides in each case defines a reinforcing rib of the disk wheel to be produced. After the casting or the production of the blank, the blank is removed from the casting die, wherein, during the removal, the sliders are displaced radially outward, thus permitting easy removal. After the removal, an outer layer of the blank is removed at least in a section of the blank which corresponds to the wheel disks, in order to improve the surface quality. The outer layer can be removed, for example, by turning or milling or another metal-cutting process, wherein further sections of the blank can also be finish-machined in order to produce flat supporting surfaces.

In addition, a development of the method makes provision for material on the reinforcing ribs to be removed in order to balance the disk wheel. The removal of the material on the reinforcing ribs can likewise be realized by turning, milling or other metal-cutting processes, such as also drilling. By means of the removed material, a distribution of material which is uniform in the circumferential direction is produced, wherein, after a tire is pulled onto the disk wheel, further balancing may be necessary, by means of which then, however, a smaller imbalance has to be reduced.

The features disclosed above can be combined as desired if this is technically possible and they do not contradict one another.

Other advantageous developments of the invention are characterized in the dependent claims and will be illustrated in more detail below together with the description of the preferred embodiment of the invention and using the figures.

The figures are schematic and by way of example and show one possible embodiment of a disk wheel according to the invention. Identical reference signs in the figures indicate identical functional and/or structural features. Since one possible embodiment is illustrated in all the figures, the description below of the figures refers at the same time to all of the figures.

DETAILED DESCRIPTION OF THE DRAWINGS

Figure 1:
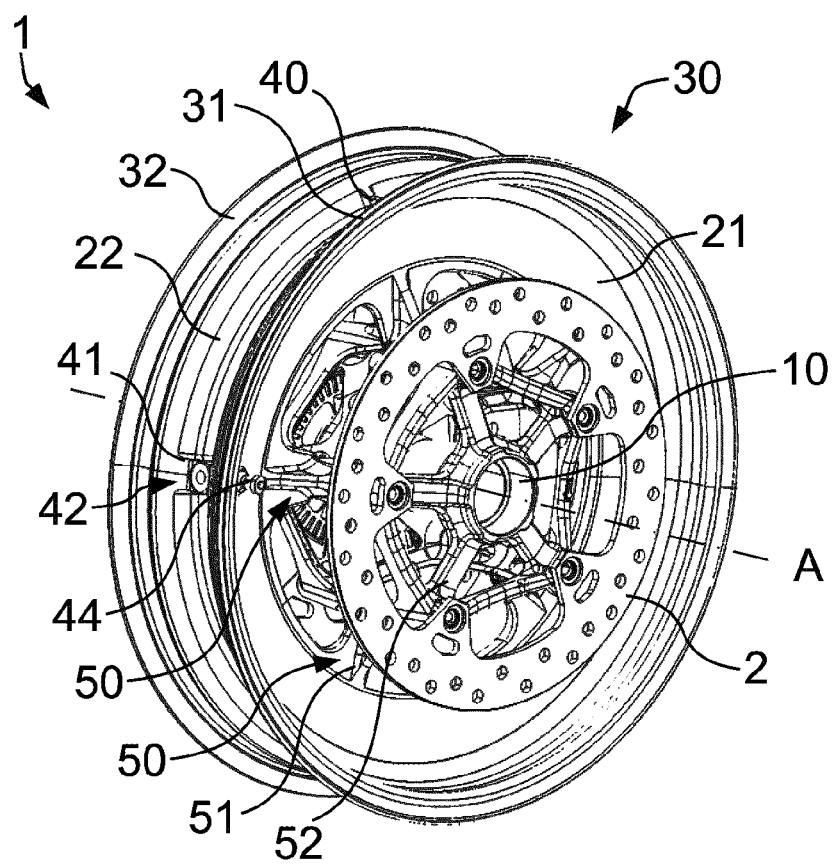
FIG. 1 is a perspective view of a disk wheel.

In FIG. 1, the disk wheel 1 is depicted in a perspective or isometric illustration. The wheel rim 30 consists of two sections 31, 32 which are separated from each other and are spaced apart from each other in a width direction parallel to the axis of rotation A of the disk wheel 1. As can be seen in FIG. 1, but also in particular in FIGS. 4 to 6, the two sections 31, 32 are connected via the wheel disks 21, 22 and the reinforcing ribs 40, 41 which lie between the wheel disks 21, 22.

The wheel disks 21, 22 extend from the wheel rim 30 or in each case from a section 31, 32 of the wheel rim 30 inward in the radial direction R toward the wheel hub 10. The wheel disks 21, 22 each provide a completely closed surface in the circumferential direction and along the distance between wheel rim and wheel hub to under the brake disks 2, 3 provided on the disk wheel 1, as a result of which the observer is provided with the typical appearance of a disk wheel at least in the region between the outer circumference of the brake disks 2, 3 and the wheel rim 30.

The region which lies within the outer circumference of the brake disks 2, 3 is not visible to the observer, when a disk wheel according to the invention is mounted on a motor vehicle or on a motorcycle, because of the brake system arranged there, and therefore the entire surface between wheel hub 10 and wheel rim 30 appears closed to the observer.

The two wheel disks 21, 22 converge with each other in the direction of the wheel hub 10 such that their distance from each other is reduced, and the distance from the axis of rotation A becomes so much smaller. The wheel disks 21, 22 here form a common section 23 which is particularly readily visible in particular in FIGS. 5 and 6 because of the respective sectional illustration and in which they are connected to each other and have a common profile toward the wheel hub 10.

In order to reduce weight, it is furthermore provided that the wheel disks 21, 22 do not extend as far as the wheel hub 10, but merge in their common section 23 into spokes 50 which extend from the common section 23 as far as the wheel hub 10 and connect the wheel rim 30 and also the first and second wheel disk 21, 22 to the wheel hub 10.

In order to stiffen the wheel disks 21, 22, the reinforcing ribs 40, 41 are furthermore provided at uniform distances in the circumferential direction about the axis of rotation A, wherein, in the case of the disk wheel 1 shown by way of example, the number of spokes 50 corresponds to the number of reinforcing ribs 40, 41 and the reinforcing ribs 40, 41 thereby merge into the spokes 50.

Figure 2:
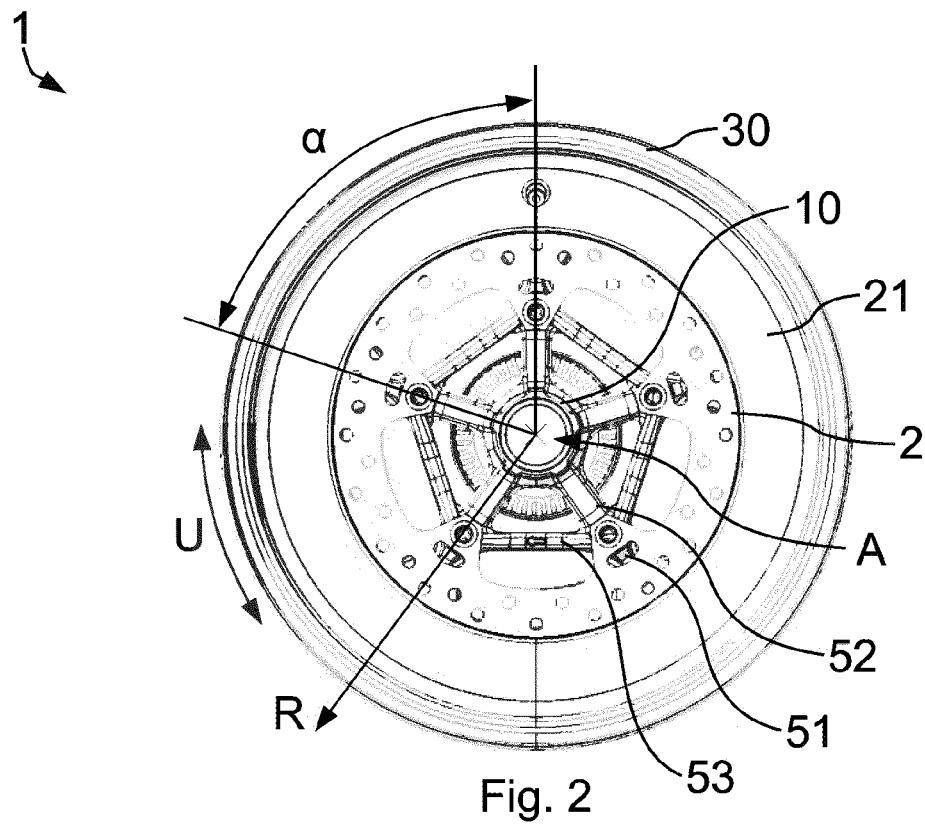
FIG. 2 is a top view of a first side of the disk wheel.
Figure 3:
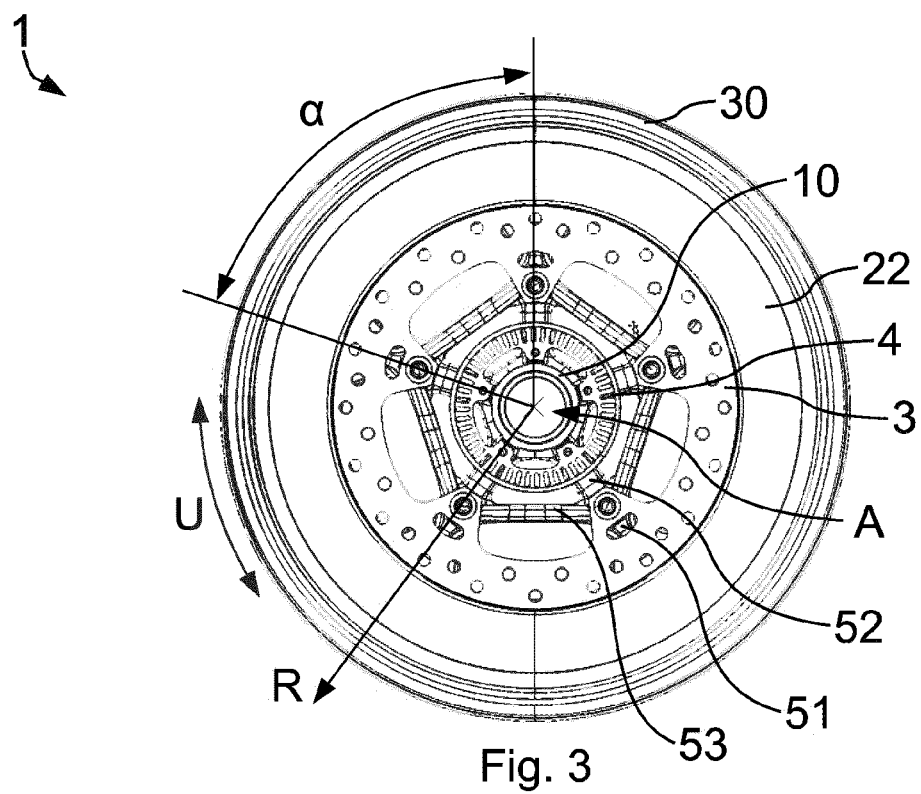
FIG. 3 is a top view of a second side of the disk wheel opposite the first side.

FIGS. 2 and 3 each show a side view of the disk wheel 1, wherein FIG. 2 corresponds to a first side view of a first side and FIG. 3 to a second side view of a second side which lies opposite the first side. The illustrated variant of the disk wheel provides five spokes 50 and five reinforcing ribs 40, 41 which are each distributed uniformly about the axis of rotation A such that an identical angle a is located between in each case two directly adjacent spokes 50 or between in each case two directly adjacent reinforcing ribs 40, 41, and the disk wheel 1 or the circular basic shape of the disk wheel 1 is divided into sectors of a circle of uniform size.

Fastened to the spokes 50 via fastening elements 61, 62, 63 is a first brake disk 2, on the first side of the disk wheel 1, and, on the second side of the disk wheel 1, a second brake disk 3 and an ABS sensor disk 4 which is surrounded in the radial direction R by the second brake disk 3.

The spokes 50 are each divided into three sections. A first section 51 runs in a plane of symmetry E of the disk wheel 1 and merges into two second sections 52 which each run spaced apart from and obliquely to the plane of symmetry E. The two second sections 52 lie in mirror-inverted form opposite each other with respect to the plane of symmetry E. In the respective transition region from the first section 51 to the two second sections 52, the fastening elements 61, 62 are designed as threaded bores for fixing the first and second brake disks 2, 3 to the disk wheel 1. In addition, at the transition sections, transverse struts 53 are provided between in each case two directly adjacent spokes 50, said transverse struts connecting the respective second sections 52 to one another in the transition region, as a result of which the spokes 50 together with the transverse struts 53 provide a basket- or cage-like construction which can be used integrally for fixing further functional elements, i.e. here the brake disks 2, 3, and provides a high degree of stability with a low weight.

In order to fix the ABS sensor disk 4, the fastening elements 63 of a third group of fastening elements are provided directly adjacent to the wheel hub 10 on the spokes 50 on the second side.

Figure 4:
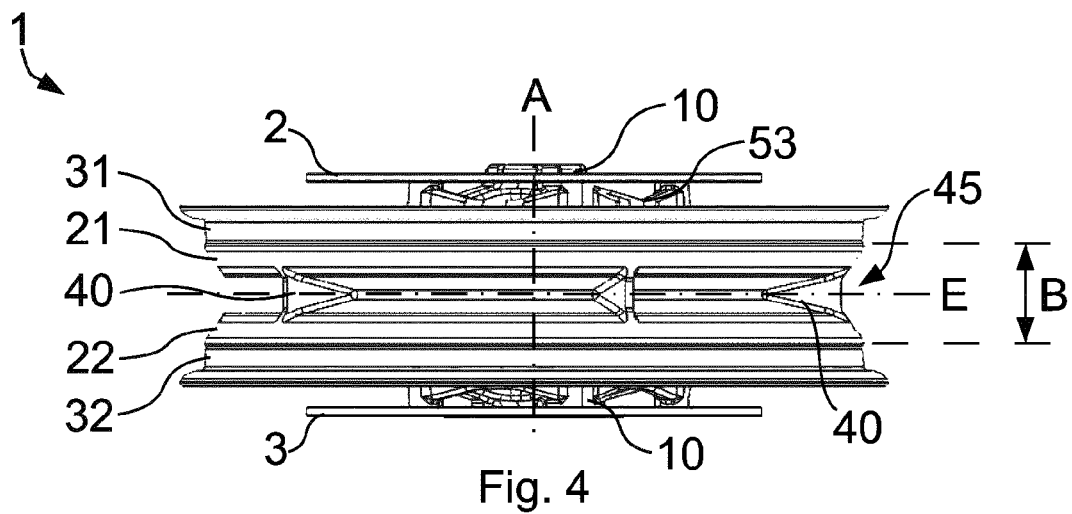
FIG. 4 is a front view of the disk wheel.
Figure 5:
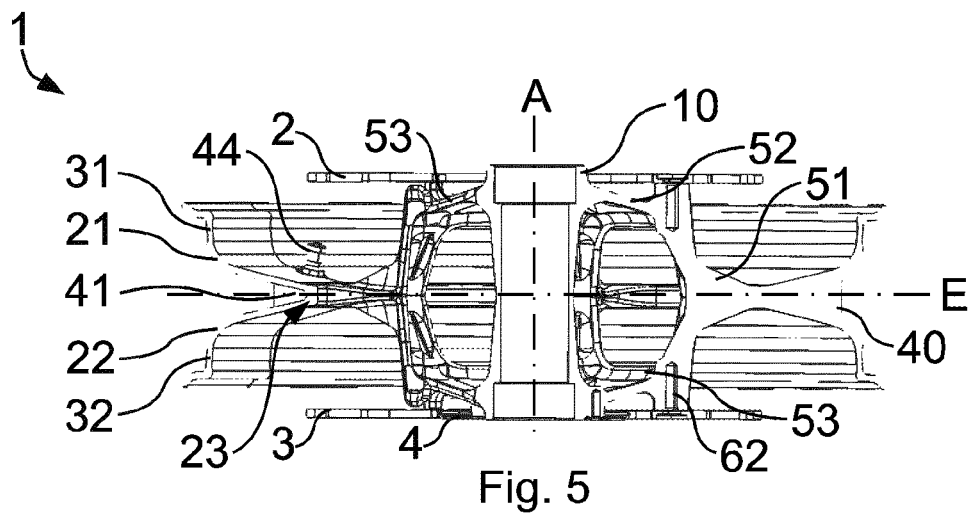
FIG. 5 is a first sectional view through the disk wheel.
Figure 6:
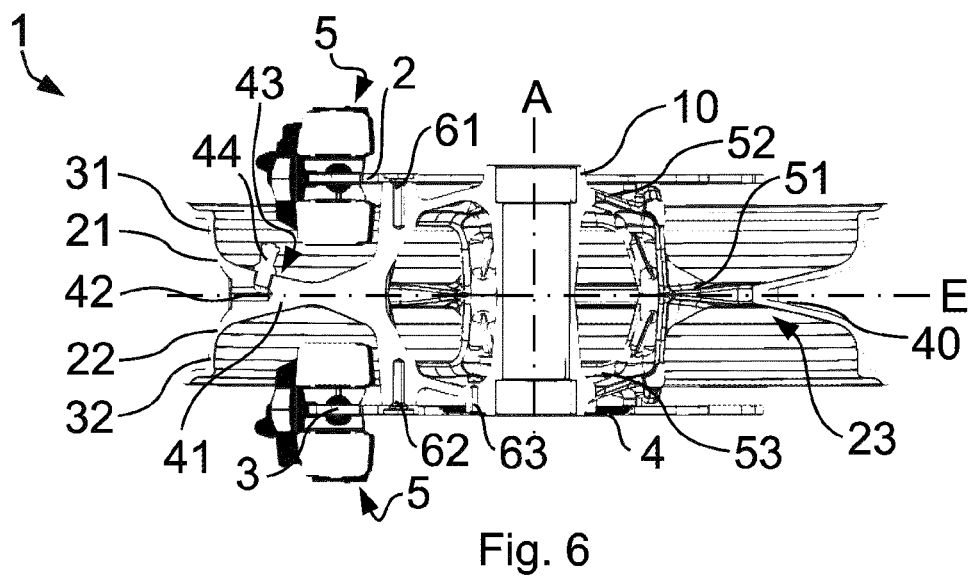
FIG. 6 is a second sectional view through the disk wheel.

FIGS. 4 to 6 each show a front view of the disk wheel 1, wherein the disk wheel 1 is sectioned along the axis of rotation A in FIGS. 5 and 6 and is rotated in the circumferential direction in relation to FIG. 5 in FIG. 6.

As illustrated in FIG. 4, the sections 31, 32 of the wheel rim 30 are spaced apart from each other by the distance B, wherein the sections 31, 32 are connected to each other by the wheel disks 21, 22. In this case, a cavity is formed in that region of the disk wheel 1 which is inwardly adjacent in the radial direction R to the wheel rim 30, said cavity being bounded by the wheel disks 21, 22 and being divided into sectors by the reinforcing ribs 40, 41. On the side 45 of the reinforcing ribs 40, 41 which faces the wheel rim 30, the reinforcing ribs 40, 41 are concave, wherein material can be removed from the reinforcing ribs 40 on the side 45 facing the wheel rim 30 in order to balance the disk wheel 1.

The section in FIG. 5 runs through one of the simple reinforcing ribs 40 that do not form a cavity 42.

In a departure therefrom, the section in FIG. 6 runs through a reinforcing rib 41 which provides a cavity 42 which is open toward the wheel rim 30 and is connected in terms of flow to an opening 43 in the wheel disk 21. In the case of the disk wheel 1 reproduced by way of example, a valve 44 is screwed into the opening 43, the valve being connected in terms of flow via the opening 43 and the cavity 42 to the wheel rim 30 or to a tire which can be arranged thereon, and therefore the tire pressure of the tire can be changed via the valve 44. Furthermore, respective brake shoes 5 are shown on both sides of the brake disks 3, 4 in FIG. 6 as part of the brake system of the motorcycle.

The invention is not restricted in its embodiment to the preferred exemplary embodiments indicated above. On the contrary, a number of variants making use of the illustrated solution even in embodiments which are of fundamentally different type is conceivable.

What is claimed is:

1. A disk wheel of a single-track motor vehicle, comprising:
   a wheel hub, which is arranged concentrically with respect to an axis of rotation of the disk wheel, for mounting the disk wheel on the motor vehicle;
   a wheel rim which is concentric with respect to said wheel hub; and
   a first wheel disk; and
   a second wheel disk, wherein
   the first wheel disk and the second wheel disk each extend from the wheel rim in a direction of the wheel hub, are spaced apart from one another on the wheel hub in a transverse direction parallel to the axis of rotation of the disk wheel,
   at least two reinforcing ribs which extend directly from the first wheel disk to the second wheel disk and directly connect the first wheel disk and the second wheel disk to each other,
   the first wheel disk and the second wheel disk converge with each other, at the at least two reinforcing ribs, toward the wheel hub, and
   the reinforcing ribs are distributed uniformly about the axis of rotation of the disk wheel of the single-track motor vehicle.

2. The disk wheel according to claim 1, wherein the first and the second wheel disk each form a surface which is completely closed in a circumferential direction about the axis of rotation.

3. The disk wheel according to claim 2, wherein the first and the second wheel disk extend from the wheel rim to the wheel hub at least over a quarter of the distance in the radial direction between the wheel rim and the wheel hub and each form the completely closed surface.

4. The disk wheel according to claim 1, wherein the wheel rim has two sections which are separated from each other and lie opposite each other in mirror-inverted form with respect to a plane of symmetry, which plane is orthogonal to the axis of rotation, of the disk wheel, and the two sections are connected to each other by the wheel disks.

5. The disk wheel according to claim 1, wherein the disk wheel is formed integrally.

6. The disk wheel according to claim 1, further comprising:
at least two spokes which each extend from the first wheel disk and the second wheel disk to the wheel hub and connect them to one another.

7. The disk wheel according to claim 6, wherein the spokes are distributed uniformly about the axis of rotation of the disk wheel.

8. The disk wheel according to claim 6, wherein
the number of spokes corresponds to the number of reinforcing ribs, and
the reinforcing ribs arranged between the wheel disks merge into the spokes.

9. The disk wheel according to claim 6, wherein the spokes each run in a first section in a plane of symmetry orthogonal to the axis of rotation and run offset with respect to the plane of symmetry in a second section.

10. The disk wheel according to claim 1, further comprising:
at least one group of fastening elements, which are arranged annularly about the wheel hub, for fixing a functional element to the disk wheel.

11. The disk wheel according to claim 1, wherein at least one reinforcing rib forms a cavity which is open to the wheel rim.

12. The disk wheel according to claim 11, wherein a sensor is arranged in the cavity.

13. The disk wheel according to claim 12, wherein in one of the two wheel disks, an opening is provided which leads to the cavity of the reinforcing rib and in which a sensor and/or a valve is accommodated.

14. The disk wheel according to claim 11, wherein in one of the two wheel disks, an opening is provided which leads to the cavity of the reinforcing rib and in which a sensor and/or a valve is accommodated.

15. The disk wheel according to claim 1, wherein excess material for balancing the disk wheel is provided on a side, facing the wheel rim, of at least a portion of the reinforcing ribs and/or in a circumferential direction about the axis of rotation at least of the portion of the reinforcing ribs.

16. A method for producing a disk wheel of a single-track motor vehicle, the method comprising:
forming the disk wheel integrally from a cast material and, during production of the disk wheel, first, casting a blank of the disk wheel that substantially corresponds to the disk wheel in a casting die having at least two slides, wherein the disk wheel includes:
a wheel hub, which is arranged concentrically with respect to an axis of rotation of the disk wheel, for mounting the disk wheel on the motor vehicle,
a wheel rim which is concentric with respect to said wheel hub,
a first wheel disk, and
a second wheel disk, wherein
the first wheel disk and the second wheel disk each extend from the wheel rim in a direction of the wheel hub, are spaced apart from one another on the wheel hub in a transverse direction parallel to the axis of rotation of the disk wheel,
reinforcing ribs extend directly from the first wheel disk to the second wheel disk and directly connect the first and second wheel disks to each other,
the first wheel disk and the second wheel disk converge with each other, at the reinforcing ribs, toward the wheel hub,
the slides are distributed uniformly about the axis of rotation of the disk wheel to be produced, and
an intermediate space between two slides in each case defines a reinforcing rib of the disk wheel to be produced; and
removing the blank from the casting die, and, during the removal, displacing the slides radially outward, wherein
an outer layer of the blank is removed at least in a section of the blank corresponding to the wheel disks of the single-track motor vehicle in order to improve surface quality.

17. The method according to claim 16, wherein material on the reinforcing ribs is removed in order to balance the disk wheel.

* * * * *